(12) United States Patent
Lee et al.

(10) Patent No.: US 11,995,073 B2
(45) Date of Patent: May 28, 2024

(54) ONE-SHOT LEARNING FOR TEXT-TO-SQL

(71) Applicant: SAP SE, Walldorf (DE)

(72) Inventors: Dongjun Lee, Seoul (KR); Jaesik Yoon, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/077,354

(22) Filed: Dec. 8, 2022

(65) Prior Publication Data

US 2023/0097443 A1    Mar. 30, 2023

Related U.S. Application Data

(63) Continuation of application No. 16/704,666, filed on Dec. 5, 2019, now Pat. No. 11,550,783.

(60) Provisional application No. 62/835,587, filed on Apr. 18, 2019.

(51) Int. Cl.
G06F 16/24       (2019.01)
G06F 16/242      (2019.01)
G06F 17/16       (2006.01)
G06N 3/045       (2023.01)

(52) U.S. Cl.
CPC ............ G06F 16/243 (2019.01); G06F 17/16 (2013.01); G06N 3/045 (2023.01)

(58) Field of Classification Search
CPC .... G06F 16/243; G06F 16/35; G06F 16/3329; G06F 40/186; G06F 40/30; G06F 16/3344; G06N 3/0454; G06N 20/00; G06N 5/04
See application file for complete search history.

(56) References Cited

U.S. PATENT DOCUMENTS

| | | | |
|---|---|---|---|
| 7,725,307 B2 * | 5/2010 | Bennett | G06F 16/24522 704/238 |
| 2004/0193567 A1 * | 9/2004 | Dettinger | G06F 16/24534 |
| 2007/0043708 A1 * | 2/2007 | Tunstall-Pedoe | G06F 16/3329 |
| 2017/0177715 A1 * | 6/2017 | Chang | G06N 5/04 |

(Continued)

OTHER PUBLICATIONS

Zhong et al., "Seq2SQL: Generating Structured Queries from Natural Language using Reinforcement Learning", 2017, arXiv:1709. 00103 (Year: 2017).*

(Continued)

*Primary Examiner* — Hosain T Alam
*Assistant Examiner* — Robert F May
(74) *Attorney, Agent, or Firm* — Buckley, Maschoff & Talwalkar LLC

(57) ABSTRACT

Provided is a system and method for detecting a SQL command from a natural language input using neural networks which works even when the SQL command has not been seen before by the neural networks. In one example, the method may include storing a candidate set comprising structured query language (SQL) templates paired with respective text values, reducing, via a first predictive network, the candidate set into a subset of candidates based on a natural language input and the text values included in the candidate set, selecting, via a second predictive network, an SQL template from among the subset of candidates based on the natural language input and text values included in the subset of candidates, and determining a SQL command that corresponds to the natural language input based on the selected SQL template and content from the natural language input.

20 Claims, 8 Drawing Sheets

(56) References Cited

U.S. PATENT DOCUMENTS

| | | | |
|---|---|---|---|
| 2017/0364520 A1* | 12/2017 | Venkataraman | G10L 15/26 |
| 2018/0032930 A1* | 2/2018 | Kolb | G06F 40/253 |
| 2018/0336198 A1* | 11/2018 | Zhong | G06N 3/08 |
| 2019/0205761 A1* | 7/2019 | Wu | G06F 16/353 |
| 2020/0004831 A1* | 1/2020 | Burceanu | G06F 40/253 |
| 2020/0301925 A1* | 9/2020 | Zhong | G06N 3/045 |
| 2020/0410011 A1* | 12/2020 | Shi | G06F 16/90332 |
| 2021/0042308 A1* | 2/2021 | Mustafi | G06F 7/14 |
| 2021/0064684 A1* | 3/2021 | Xue | G06N 20/20 |

OTHER PUBLICATIONS

Huang et al., "Natural Language to Structured Query Generation via Meta-Learning", 2018, arXiv:1803.02400 (Year: 2018).*

892 Form dated Mar. 31, 2022 with was issued in connection with U.S. Appl. No. 16/704,666.

892 Form dated Sep. 21, 2022 with was issued in connection with U.S. Appl. No. 16/704,666.

Notice of Allowance dated Sep. 21, 2022 with was received in connection with U.S. Appl. No. 16/704,666.

* cited by examiner

100

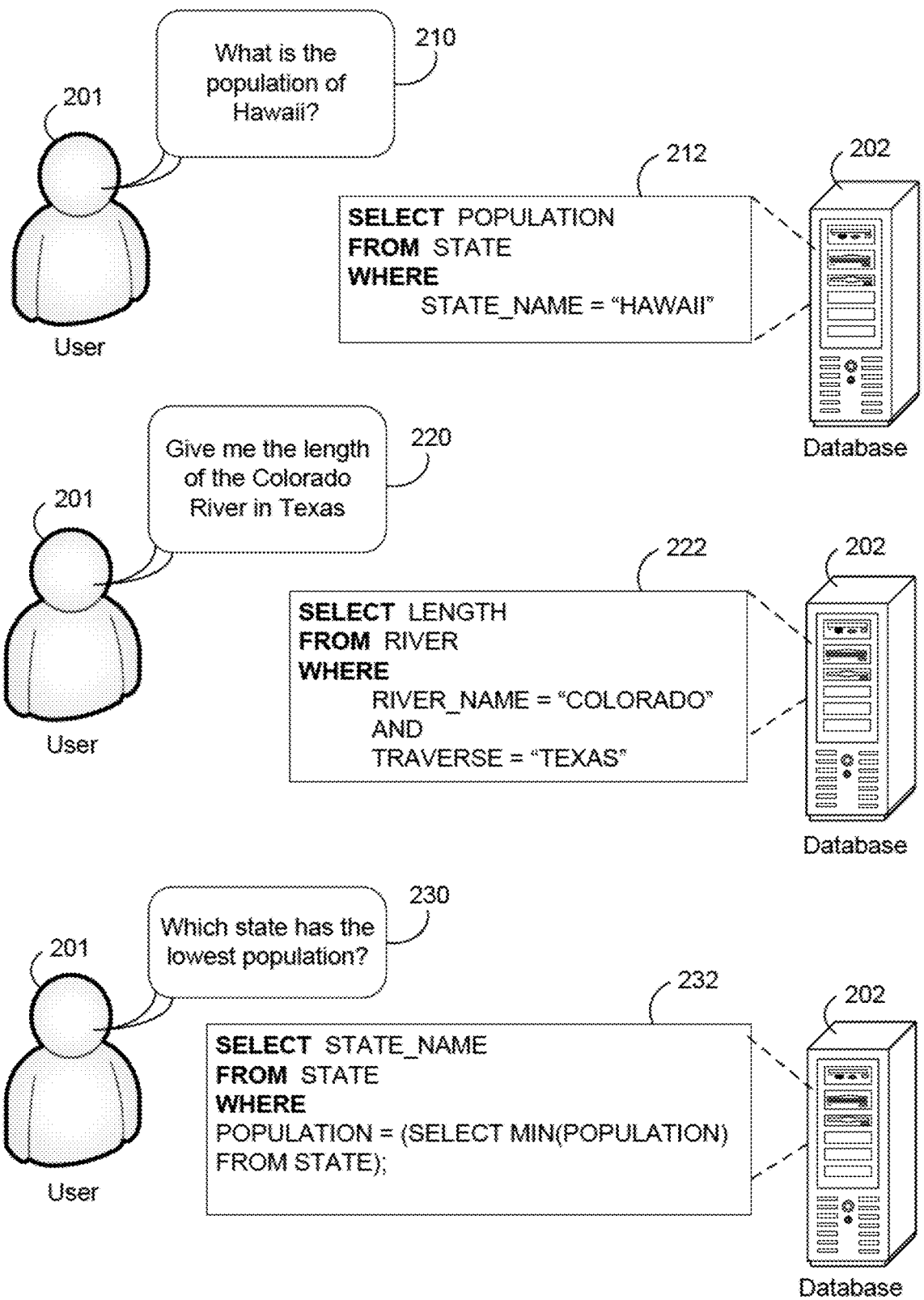

(Candidate Search Network)

(Matching Network)

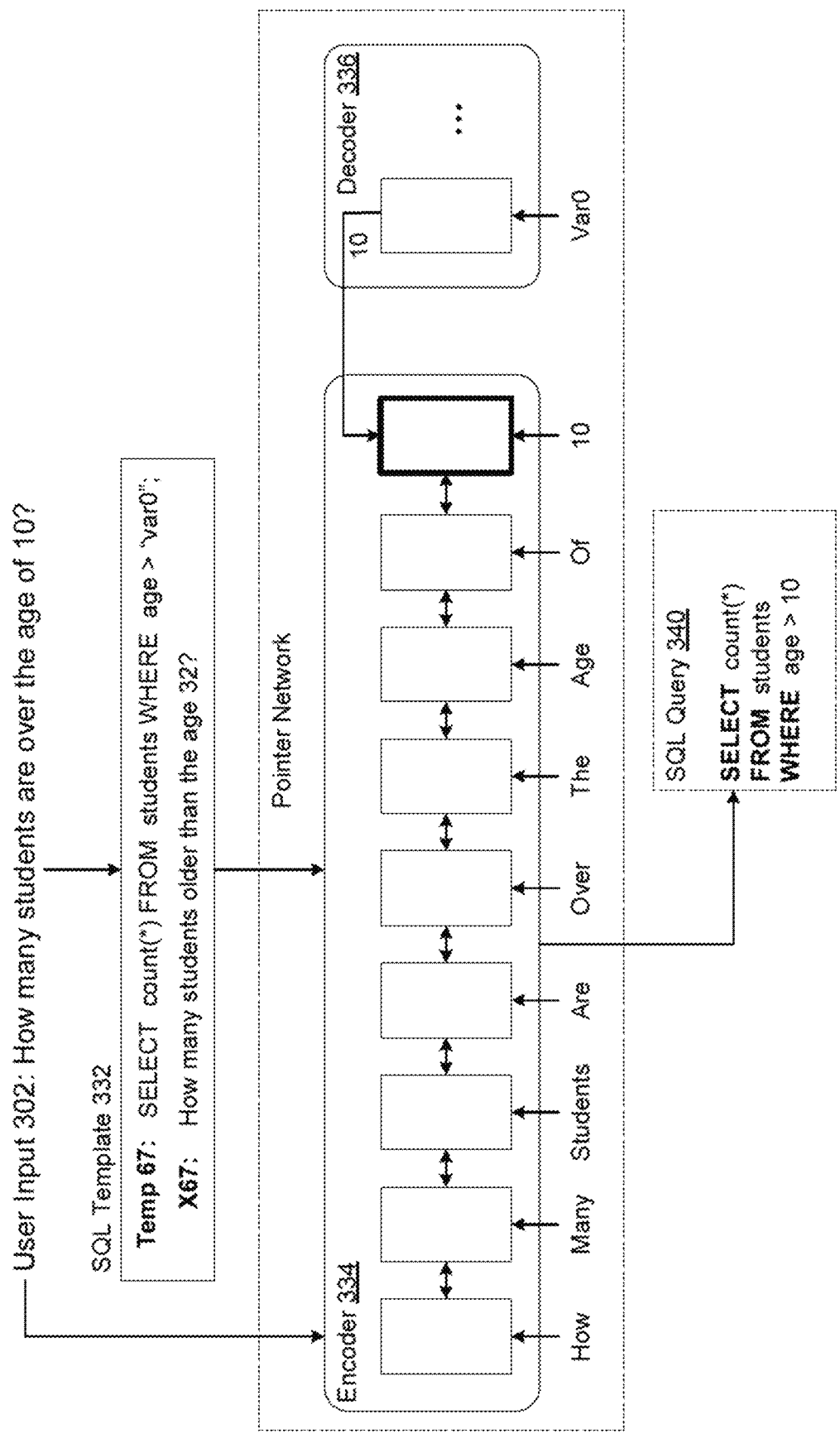

ONE-SHOT LEARNING FOR TEXT-TO-SQL

CROSS-REFERENCE TO RELATED APPLICATION(S)

This application is a continuation of U.S. patent application Ser. No. 16/704,666, filed on Dec. 5, 2019, in the United States Patent and Trademark Office, which claims the benefit of U.S. Provisional Patent App. No. 62/835,587, filed on Apr. 18, 2019, in the United States Patent and Trademark Office, the entire disclosures of which are hereby incorporated by reference for all purposes.

BACKGROUND

Natural language processing is a technology that enables a computer to understand a human's natural language. Examples of natural language include English, French, Chinese, and the like, and should not be confused with computer programming languages such as C, Java, Python, etc. Teaching a machine to understand how humans communicate is not an easy task. The objective of natural language processing is to program the computer to read, decipher, understand, and make sense of human languages in a manner that provides value. Early natural language processing systems were based on hard-coded rules. The rules were typically used to parse and pattern match speech to particular words. However, a rule-based approach is generally of low precision and only effective in specific use cases.

More recent natural language processing systems rely on the use of machine learning. Traditional machine learning includes probabilistic modeling, likelihood maximization, and linear classifiers. Other approaches involve the use of neural networks. In either case, the machine learning system "learns" from training data. For example, neural networks "learn" important features through many training runs. The training tends to focus on the most common cases. To make a model more robust typically requires a larger variety and amount of training data. One of the major drawbacks of known machine learning techniques is that for the model to recognize a particular speech input from natural language, the model must have been previously trained on the particular speech input. Because of this rigidity, the model cannot accurately recognize speech it has not been previously trained to recognize.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a process of a database detecting SQL commands based on natural language inputs in accordance with an example embodiment.

FIG. 3D is a diagram illustrating a pointer network of the learning architecture shown in FIG. 3A, in accordance with an example embodiment.

Figure 1:
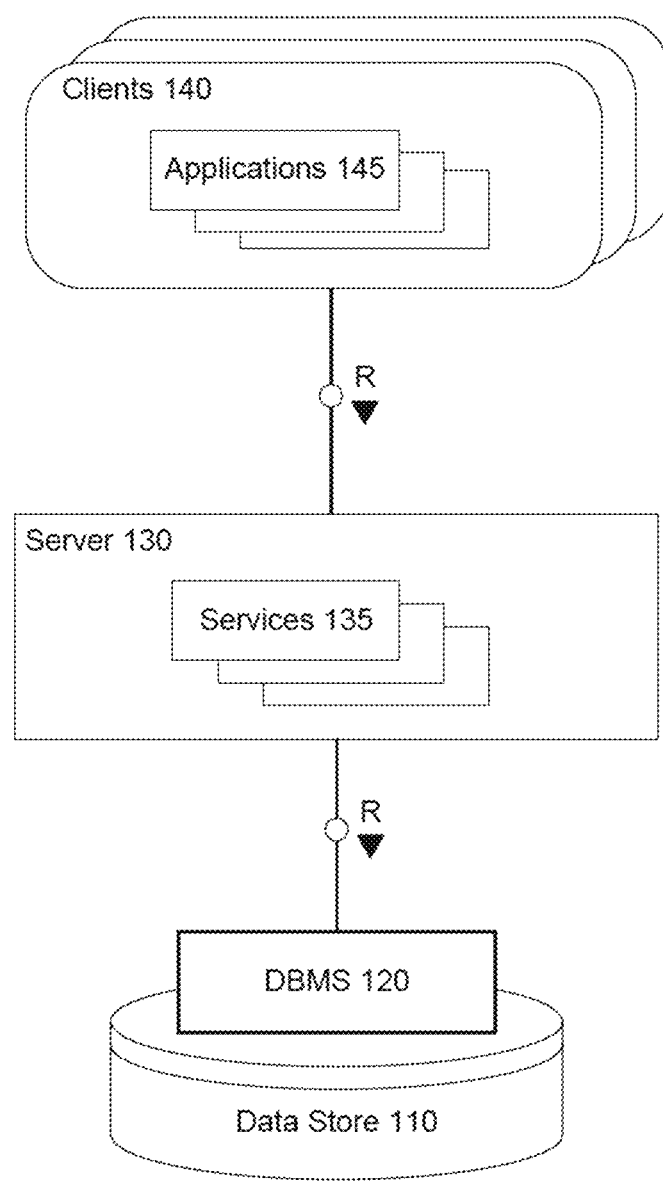
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments are directed to a system that can translate a natural language input into a structured query language (SQL) command, also referred to herein as text-to-SQL generation. Related approaches to text-to-SQL generation cannot generate queries of unobserved templates. To support SQL of new templates, related approaches require a lot of examples and additional training. In contrast, the example embodiments provide a mechanism that can fast adapt to unseen templates using one-shot learning. Accordingly, the system can generate SQL queries of unobserved templates based on a single example without additional training. The system comprises an architecture that uses a combination of deep learning neural networks. For example, a first deep learning neural network may operate on a larger set of SQL templates and reduce the set into a smaller subset. A second deep learning neural network may select one of the SQL templates from the smaller subset that most closely matches the natural language input. A pointer network may fill-in slots of the SQL template with content from the natural language input to create an appropriate SQL query.

The architecture is a combination of a template-based model (search network and matching network) and a sequence-to-sequence-based model (pointer network). By combining the different models, and using beneficial attributes of each, the architecture can support complex SQL query translations, including SQL queries that are previously unobserved. The system works in two phases. During a first phase, the system receives and matches a natural input language to a SQL template through a combination of a candidate search network and a matching network which are performed in sequence. For example, the candidate search network may limit/reduce all possible SQL template candidates to a predefined subset (e.g., 3, 5, 7, etc.) of SQL templates and the matching network may select a most-closely matching SQL template from the smaller subset. During the second phase, the pointer network fills-in variables in the selected SQL template with tokens from the natural language input, thereby completing the translation of the SQL query.

The candidate set includes a plurality of candidates (e.g., hundreds, thousands, etc.). Each candidate in the set includes an SQL template (SQL syntax with open slots) paired with a natural language text input that corresponds to the SQL template. Each pair may have a unique SQL template and a unique natural language text input paired therewith. The deep learning neural networks can identify similarities between a received natural language input and an SQL template by comparing the corresponding natural language text paired together with the SQL template to the received natural language input. The deep learning networks may convert the natural language text and the natural language input into vectors, and perform a vector similarity comparison such as cosine similarity, etc. Each of the candidate search network and the matching network may use different functions to convert the text/input into vectors.

The example embodiments may be applied to a database in which SQL queries are performed to query/access/read data from the database. To support SQL queries, related text-to-SQL generation mechanisms require a number of natural language examples for each template and the retraining of the model. In contrast, the example embodiments may rely on just a single example and no retraining. Moreover, the model used herein is not merely limited to generating SQL but can also be applied to the other code generation tasks by defining templates of code and variables for each template.

FIG. 1 illustrates a system architecture of a database 100 in accordance with an example embodiment. It should be appreciated that the embodiments are not limited to architecture 100 or to a database architecture, however, FIG. 1 is shown for purposes of example. The text-to-SQL generation system described herein may be implemented by the database. For example, the database may include or interact with software which performs natural language processing based on the one-shot text-to-SQL model of the example embodiments.

Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute one or more of the applications 145 to perform visual analysis via a user interface displayed on the client 140 to view analytical information such as charts, graphs, tables, and the like, based on the underlying data stored in the data store 110. The applications 145 may pass analytic information to one of services 135 based on input received via the client 140. A structured query language (SQL) query may be generated based on the request and forwarded to DBMS 120. DBMS 120 may execute the SQL query to return a result set based on data of data store 110, and the applications 145 may create a report/visualization based on the result set. In this example, DBMS 120 may perform a query optimization on the SQL query to determine a most optimal alternative query execution plan.

The applications 145 and/or services 135 may be used to identify and combine features for training a machine learning model. Raw data from various sources may be stored in the data store 110. In this example, the applications 145 and/or the services 135 may extract core features from the raw data and also derive features from the core features. The features may be stored as database tables within the data store 110. For example, a feature may be assigned to its own table with one or more columns of data. In one example, the features may be observed as numerical values. Furthermore, the applications 145 and/or the services 135 may merge or otherwise combine features based on a vertical union function. In this example, the applications 145 and/or the services 135 may combine features from a plurality of database tables into a single table which is then stored in the data store 110.

According to various embodiments, one or more of the applications 145 and the services 135 may be configured to perform translation of natural language into an SQL query. Thus, the applications 145 and/or service 135 may provide a natural language interface to the database and the data stored therein. For example, the database may include a microphone which receives spoken input. The database may also include a speech-to-text converter for converting the spoken input into text. As another example, the applications 145 and/or the services 135 may receive a natural language input from another computer/application that is connected to the database via a network, etc.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of the applications 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

FIG. 2 illustrates a process 200 of a database detecting SQL commands based on natural language inputs in accordance with an example embodiment. Referring to FIG. 2, a user 210 may input natural language (spoken content) to a database 202. In response, the database 202 may determine a SQL command/query that can be used to access the data necessary to answer the input from the user 201. For example, in a first input 210, the user 201 asks for the population of Hawaii. In response, the database 202 determines a SQL query 212 for retrieving the answer to the input 210. Here, the SQL query 212 includes SQL syntax capable of being used to retrieve value of "POPULATION" from a table identified as "STATE" and a row of the table identified as "HAWAII." Here, the SQL query 212 includes a SELECT statement, a FROM clause, and a WHERE clause. Other SQL syntax may also be generated by the database 202 from the natural language input including nested queries and other complex SQL syntax.

As another example, in a second input 220, the user 201 requests the length of the Colorado River within the state of Texas. In response, the database 202 determines a corresponding SQL query 222 which can be used to access data for answering the input 220. In this example, the SELECT statement selects the variable length from a table identified as "RIVER" and a row identified as "COLORADO" and a column identified as "TEXAS". As another example, in a third input 230, the user 201 requests the state that has the lowest population. In response, the database 202 generates a SQL command 232 which selects a name of a state from a table identified as "STATE" and a row in which the population is the lowest value (minimum) with respect to other rows in the table.

Neural networks usually require hundreds or thousands of examples in order to learn a class of text. To overcome this limitation, the one-shot learning architecture described herein can learn a classification from a single labeled example. In this way, one-shot learning can be applied to text-to-SQL generation in order to detect a SQL query using just a single example and adapt easily and promptly to the SQL of untrained templates.

A matching network may train an end-to-end k-nearest neighbor (kNN) network by combining feature extraction and a differentiable distance metric with cosine similarity. The matching network enables the model to produce test labels for unobserved classes/candidates given only a few samples without any network tuning. However, the n-way classification setting used in a matching network cannot be directly applied to a general classification problem, because a matching network only works on a fixed number of target classes (e.g., a small number n of possible candidates) by sampling from all possible classes. To address this, the example architecture described herein introduces a candidate search network which chooses a top-n most relevant classes/candidates from an larger set to support the matching network.

The pointer network predicts an output sequence as probability distributions over the tokens in the input sequence. The pointer network can be successfully applied to question answering, abstractive summarization, and code generation. In the example embodiments, the pointer network is adapted to fill variables of the selected/predicted SQL template using tokens (e.g., words, text, etc.) from the natural language input sentence.

As further described herein, the architecture is considered a one-shot learning text-to-SQL generation model because only one new candidate needs to be added to the candidate set (known sets) to make the model applicable to the new SQL query (e.g., the newly filled-in template). In this way, the model can adapt to the new template of SQL with a single example, without additional training. For example, assume there is a natural language to SQL template pair (x0; y0) and that y0 is the unseen template during the training. The system only needs to add one example pair (x0; y0) to a candidate set C to make the model applicable to the new template y0 for future usage.

Figure 3A:
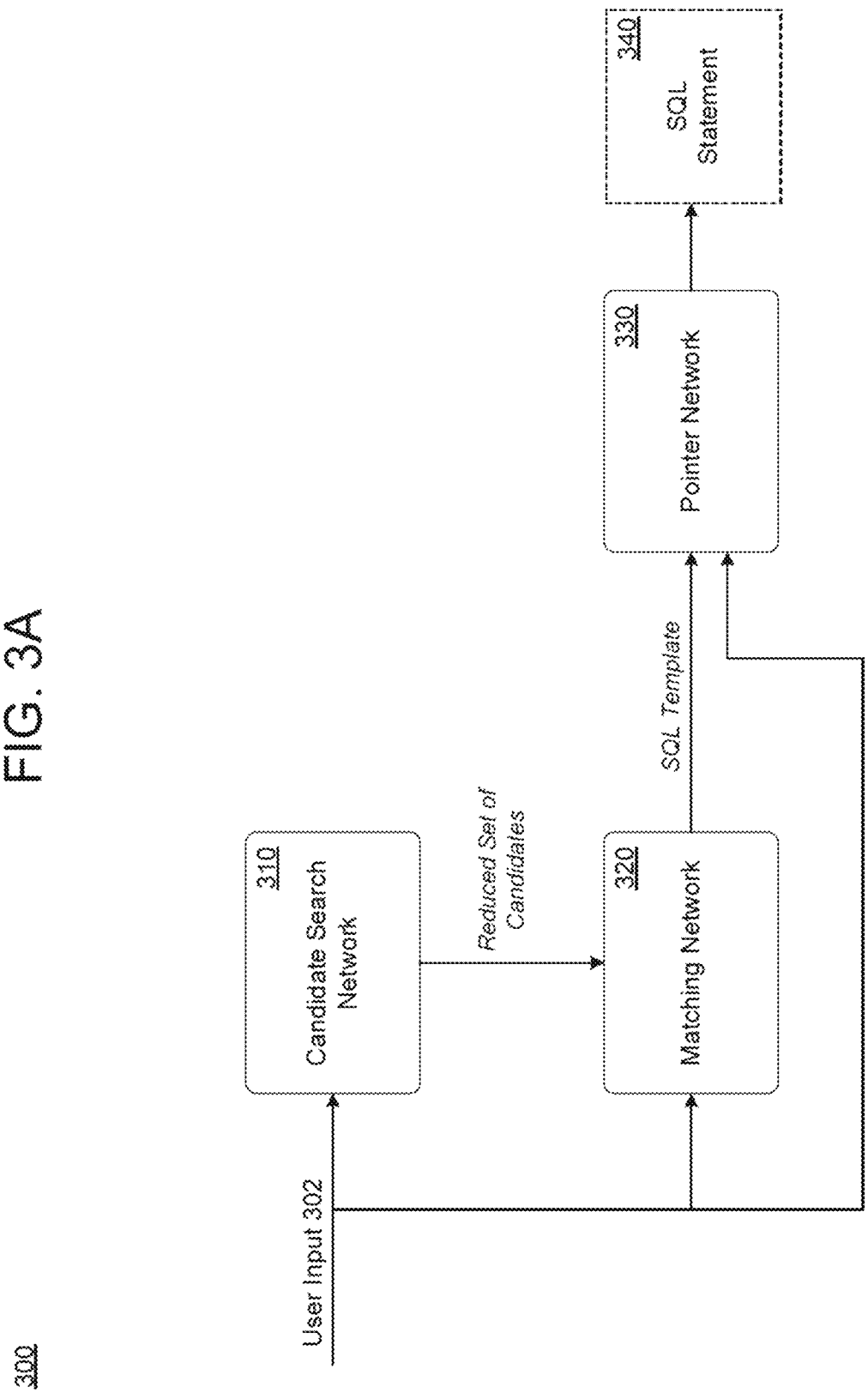
FIG. 3A is a diagram illustrating a learning architecture for one-shot learning of text-to-SQL generation in accordance with an example embodiment.

FIG. 3A illustrates an architecture 300 for one-shot learning of text-to-SQL generation in accordance with an example embodiment. Referring to FIG. 3A, an overall architecture 300 of the system is illustrates. Natural language may be input from a user (user input 302). The system may receive the user input 302 through a local audio device (microphone) and convert speech within the audio to text. As another example, the user input 302 may already be in text format and may be received from another system, application, etc.

The template selection process includes two deep learning neural networks including a candidate search network 310 and a matching network 320. A candidate set (shown in FIG. 3B) may be input to the candidate search network 310. The candidate set may include SQL templates paired with natural language text corresponding to the SQL templates. The candidate search network 310 may compare the natural language text paired with the SQL templates to the natural language input of the user input 302. The candidate search network 310 may reduce the candidate set down to a predetermined number (subset) of most-closely matching candidates. This subset of candidates can be provided to the matching network 320.

In response, the matching network 320 may perform a comparison of natural language text in the SQL templates in the subset of candidates, and identify one candidate that most closely matches the user input 302. The SQL template from this candidate may be selected and output to the pointer network 330. Here, the matching network 320 may only work on a smaller number of inputs. Thus, the candidate search network 310 makes it possible for the matching network 320 to perform a SQL template selection. The pointer network 330 may fill-in the empty slots of the selected SQL template using tokens from the user input 302 to create a SQL Statement 340.

The architecture 300 provides a deep learning approach for text-to-SQL generation which includes a combination of a template-based model and sequence-to-sequence-based model. We want to improve template-based approach so that we can mix the advantages of template based approaches with sequence to sequence based approaches. In particular, the architecture 300 extends a template-based model with one-shot learning. The architecture 300 is not limited to any format of SQL, and it is free of SQL syntax error. Furthermore, the architecture 300 can generate trained templates of SQL, but it can also adapt to a newly seen SQL query without additional training.

Figure 3B:
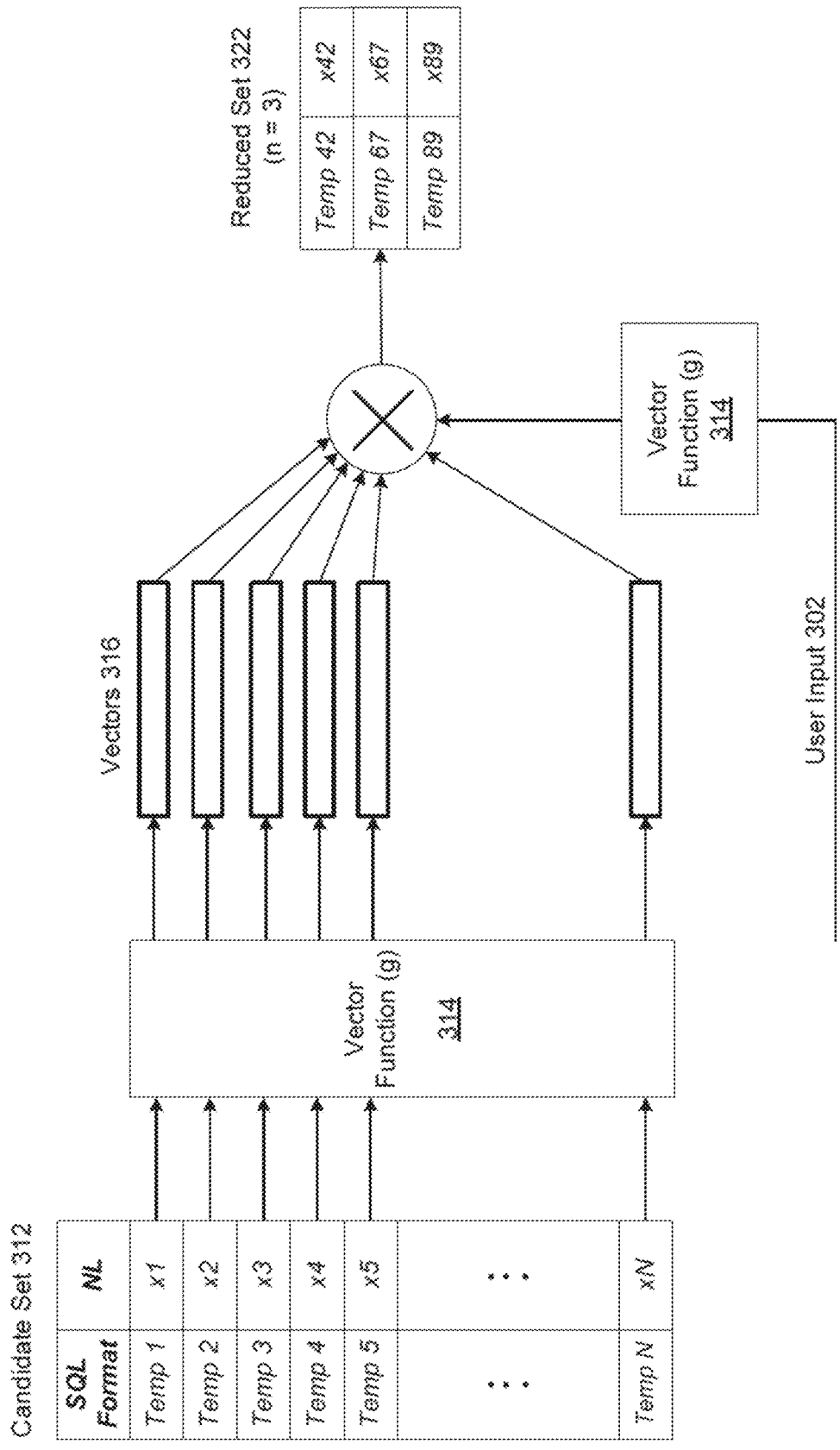
FIG. 3B is a diagram illustrating a candidate search network of the learning architecture shown in FIG. 3A, in accordance with an example embodiment.

FIG. 3B illustrates the candidate search network 310 of the architecture 300 shown in FIG. 3A, in accordance with an example embodiment. Referring to FIG. 3B, the candidate search network 310 identifies a subset (reduced set 322) of candidates from a larger candidate set 312 using a deep learning neural network. Each candidate included in the candidate set 312 includes a SQL template paired with a natural language text corresponding thereto. In other words, each unique SQL template is paired with a corresponding unique natural language input that triggers the SQL template.

To reduce the candidates within the candidate set 312, the deep learning neural network converts the candidates into vectors 316. In particular, the deep learning neural network converts the natural language text (paired with each SQL template) into a vector format (number) using a vector function (g) 314. Likewise, the deep learning neural network also converts the user input 302 into a vector format. Furthermore, the deep learning neural network compares the vectors 316 of the candidate set to the vectorized format of the user input 320, and chooses the top-n most relevant vectors 316. The comparison may be performed using a cosine similarity function, etc. The value of n may be predefined by the system or a user. For example, the value n may be 3, 4, 5, 10, and the like. By reducing the candidate set 312 down to n number of candidates, the matching network 320 can be used.

The candidate set 312 comprises sample pairs of natural language questions and their corresponding labels (SQL templates). The pairs may be generated by sampling one example pair from each whole class (N) in a training dataset (not shown). For a given user input 302, the candidate search network 310 chooses the top-n most relevant items with respect to the user input 302 from the candidate set 312 to build the reduced set 322. To build the candidate search network 310, the system may train a convolutional neural network (CNN) text classification model with the training dataset. From this network, the system can take features from the last layer before the final classification layer in order to get a feature vector. Then, the system can choose the top-n most similar items with the user input 302 using the cosine similarity of the feature vectors to build the reduced set.

According to various embodiments, the candidate search network 310 searches all possible candidate templates and finds a top-n most relevant SQL templates for a given natural language question (user input 302). In the candidate set, every possible SQL format may be saved in a dictionary. Each candidate includes a pair of items, a natural language question and a SQL template/format. The matching network 320 does not work for large sets of candidates. Therefore, to use the matching network 320, the candidate search network 310 reduces the candidate set 312 to a significantly smaller set.

The candidate set 312 is fed into the deep learning neural network (convolutional neural network) that learns to classify natural language. Here, the network may encode each natural language into a vector 316. Every natural language question in the candidate set 312 is converted into a vector 316 by the neural net. Also, the user input 302 is converted into a vector. Then a cosine similarity is performed to find a closest (closest angle) between the vectors which finds the top-n most-closest candidates. The text is what is input to the neural net, which converts into vector 316, saves it to memory, and convolves to generate the reduced set 322.

Figure 3C:
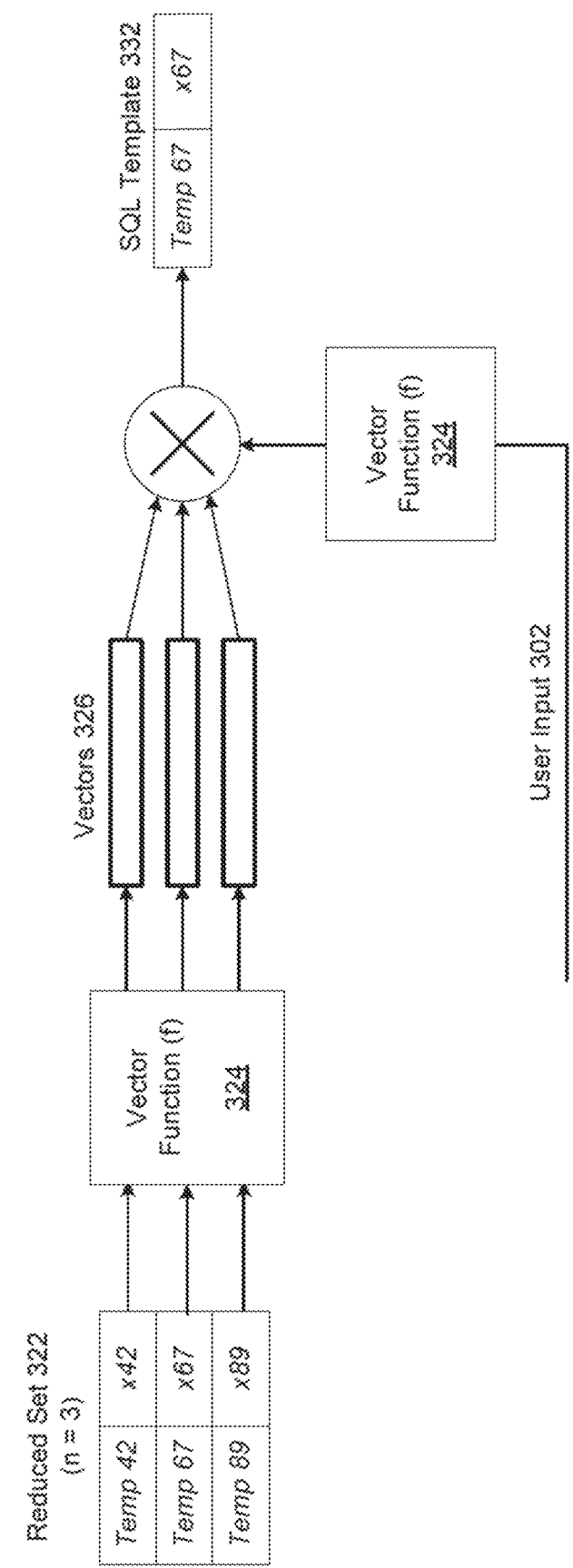
FIG. 3C is a diagram illustrating a matching network of the learning architecture shown in FIG. 3A, in accordance with an example embodiment.

FIG. 3C illustrates the matching network 320 of the architecture 300 shown in FIG. 3A, in accordance with an example embodiment. Referring to FIG. 3C, the reduced set 322 which is output from the candidate search network 310 is fed into the matching network 320. Similar to the candidate search network 310, the matching network includes a deep learning neural network which converts the candidates in the reduced set 322 into vectors 326. In particular, the deep learning neural network converts the natural language text of the candidate set into vectors 326 using a vector function (f) 324. Furthermore, the user input 302 is also converted into a vector format using the vector function (f) 324. Then, a cosine similarity is performed to compare the vectors 326 of the reduced set 322 to the vectorized user input 302. In the matching network 320, the neural network uses a different function to convert the candidates into vectors and chooses a closest vector using cosine similarity.

Furthermore, an SQL template 332 from the selected candidate set is retrieved and forwarded to the pointer network 330, as the most appropriate SQL template for the user input 302. In other words, the result of the matching network 320 is a most appropriate matching template 332 from among all possible SQL templates.

FIG. 3D illustrates the pointer network 330 of the architecture 300 shown in FIG. 3A, in accordance with an example embodiment. Referring to FIG. 3D, the selected template 332 includes one or more slots/variables that need to be filled-in. The pointer network 330 may use an encoder/decoder architecture to select a token (text) from the natural language input 302 to be used to fill the slot(s) of the selected template 332 to generate an SQL Query 340.

In FIG. 3D, the input of the pointer network 330 includes the user input 302. Meanwhile, the template 332 selected by the matching network 320 in FIG. 3C, includes a similar query, but not exactly the same. In this case, the template 332 is based on the natural language input "How many students are older than age 32?" Thus, there are some differences between the user input 302 and the selected SQL template 332, including different words and numbers. The pointer network 330 may fill-in the selected SQL template 332 with a new variable and replace the variable "32" in the selected SQL template 332 with the term "10". In this example, the single example is the query of the selected SQL template 332. Meanwhile, pointer network can fill-in the SQL template 332 selected through one-shot learning with a different word (or words) to create a SQL query that does not already have an existing template.

In this example, the system uses a bi-directional long short term memory (LSTM) as an input encoder 334 and a uni-directional LSTM as an output decoder 336. Here, it is assumed that $(x_1, \ldots, x_n)$ denote tokens in the natural language input 302 and $(v_1, \ldots, v_m)$ denote variables in the SQL template 332. Then the encoder 334 hidden states are $(e_1, \ldots, e_n)$ and the decoder 336 hidden states are $(d_1, \ldots, d_m)$. At each time step (t) in the decoding phase for each variable $v_t$, the system can compute the attention vector as:

$$u_i^t = v \tan h(W_1 e_i + W_2 d_t), i \in (1, \ldots, n)$$

Where $W_1$ and $W_2$ are trainable parameters. Then, the system may apply a softmax to obtain a likelihood over the tokens in he input sequence as follows:

$$p(y_t|y_1, \ldots, y_{t-1}, x) = \text{softmax}(u^t)$$

Where $y = (y_1, \ldots, y_m)$ is a sequence of indices each between 1 and n. The training objective is to maximize the log-likelihood of the predicted tokens for the given natural language input and list of variables in the SQL template as follows: For the parameter sets of the pointer network 330, $$\underset{\phi}{\text{argmax}} \sum_{(x,v,y) \in D} \log p_\phi(y|x,v)$$

Where D denotes the training dataset.

Figure 4:
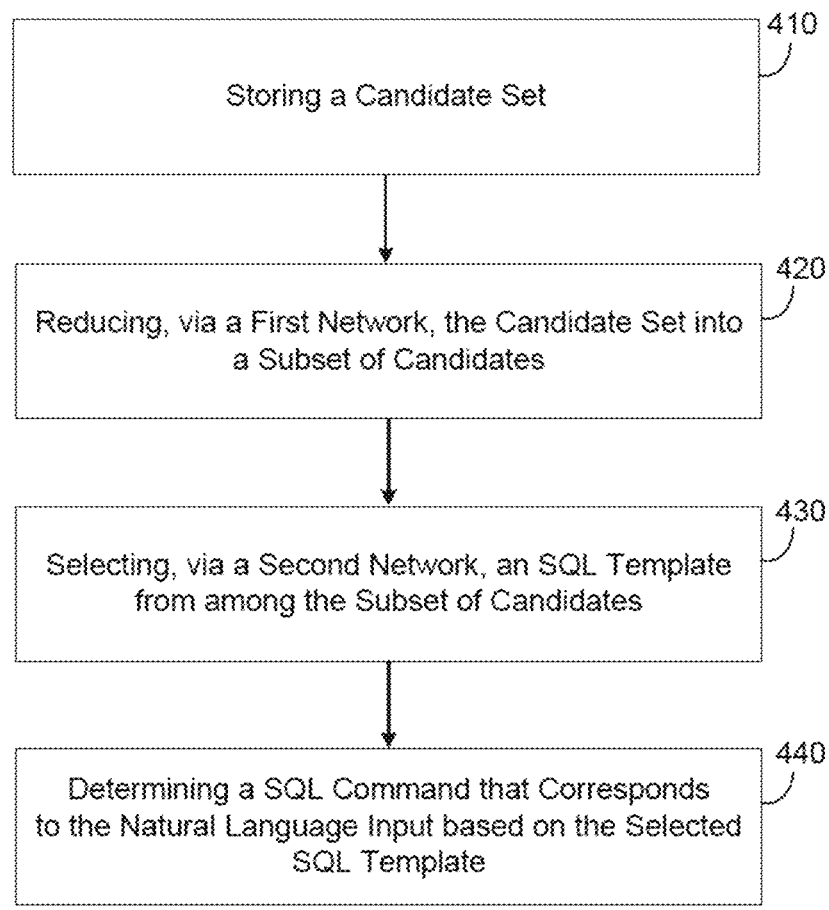
FIG. 4 is a diagram illustrating a method of determining an SQL command from natural language in accordance with an example embodiment.

FIG. 4 illustrates a method 400 of determining an SQL command from natural language in accordance with an example embodiment. For example, the method 400 may be performed by a software program running on a database node, a cloud platform, a server, a computing system (user device), a combination of devices/nodes, or the like.

Referring to FIG. 4, in 410, the method may include storing a candidate set comprising structured query language (SQL) templates paired with respective text values corresponding to the SQL templates. The candidate set may include a table with a plurality of rows corresponding to a plurality of candidates and columns for SQL templates and text values (natural language inputs) that corresponds to the respective SQL templates. Each candidate set may include a unique SQL template paired with a unique natural language text value.

In some embodiments, although not shown in FIG. 4, the method may include receiving a natural language input which may include speech of a user that is input via a microphone, etc. The natural language input may be converted into a text format using one or more speech-to-text converters. In some embodiments, the natural language input may be filtered or further processed to remove noise, etc.

In 420, the method may include reducing, via a first predictive network, the candidate set into a subset of candidates based on a natural language input and the text values included in the candidate set. For example, the reducing may include converting the text values of the candidate set into a set of vectors and converting the natural language input into a natural language vector using a first function, and comparing the set of vectors to the natural language vector to identify a subset of vectors from the set of vectors that most closely matches the natural language vector. In this example, the comparing may include comparing the set of vectors to the natural language vector via cosine similarity. In some embodiments, a target size of the subset of candidates may include a fixed size that is predefined in advance.

In 430, the method may include selecting, via a second predictive network, an SQL template from among the subset of candidates based on the natural language input and natural language text included in the subset of candidates. For example, the selecting may include converting natural language text of the subset of candidates into a subset of vectors and converting the natural language input into a natural language vector using a second function, and comparing the subset of vectors to the natural language vector to select a vector from the subset of vectors that most closely matches the natural language vector. In this example, the second function may be different than the first function.

In 440, the method may include determining a SQL command that corresponds to the natural language input based on the selected SQL template and content from the natural language input. For example, the determining may include filling-in one or more slots of the selected SQL template with one or more words from the natural language input. In some embodiments, the determining may include determining, via a third predictive network, a word from the natural language input which belongs in an empty slot of the selected SQL template. In some embodiments, the method may further include generating a response to the determined SQL command, and outputting the response to at least one of a user interface and a software program.

Figure 5:
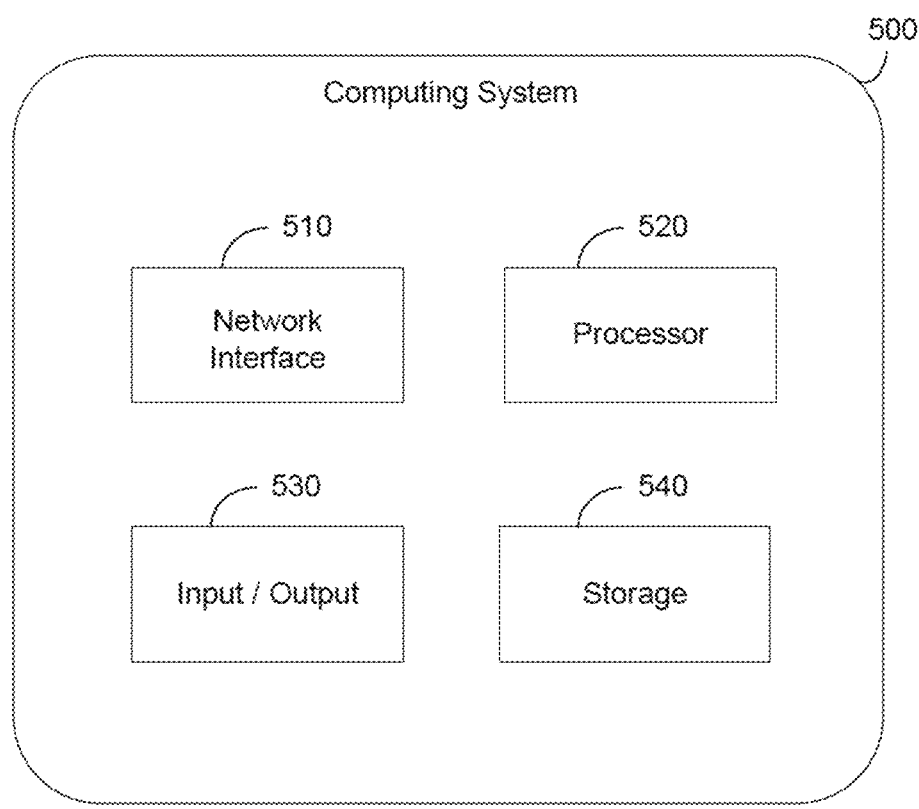
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a microphone, a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. In various examples, the storage 540 may include a data store having a plurality of tables, partitions and sub-partitions. The storage 540 may be used to store database records, items, entries, and the like. Also, the storage 540 may be queried using SQL commands.

According to various embodiments, the storage 540 may store a candidate set that may include SQL templates paired with respective text values. The processor 520 may reduce, via a first predictive network, the candidate set into a subset of candidates based on the natural language input and the text values included in the candidate set. The processor 520 may select, via a second predictive network, an SQL template from among the subset of candidates based on the natural language input and text values included in the subset of candidates. The processor 540 may determine a SQL command that corresponds to the natural language input based on the selected SQL template and content from the natural language input.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store an initial set of predefined structured query language (SQL) templates, each unique SQL template of the initial set being paired with unique natural language text values corresponding to each respective SQL template; and
a processor configured to:
execute a first neural network on a natural language input, the executing of the first neural network includes reducing the initial set of predefined templates down to a smaller-sized set of N of the predefined templates based on the natural language input, where N is greater in size than one and less in size than a size of the initial set;
execute a second neural network, different than the first neural network, on the smaller-sized set of N predefined templates, the executing of the second neural network includes selecting one predefined template from the smaller-sized set of N predefined templates that most closely matches the natural language input and the natural language text values included in the smaller-sized set of N predefined templates, the natural language input being previously unseen by the first and second neural networks and different than the unique natural language text values corresponding to the selected predefined template from the smaller-sized set of N predefined templates;
generate a SQL command statement corresponding to the natural language input based on replacing one or more text values of the selected predefined template with content from the natural language input; and
generate a response to the natural language input by executing a query against a database, the query being based on the generated SQL command statement.

2. The computing system of claim 1, wherein the execution of the first and second neural networks is based on the set of natural language input texts paired with the set of predefined templates.

3. The computing system of claim 1, wherein the processor is configured to identify a table from the database that corresponds to the natural language input and add an identifier of the table into an empty slot of the selected predefined template.

4. The computing system of claim 3, wherein the processor is configured to identify a row in the table of the database that corresponds to the natural language input and add an identifier of the row into an empty slot of the selected predefined template.

5. The computing system of claim 1, wherein the first neural network comprises a different function for converting predefined template content into vector format than the second neural network.

6. The computing system of claim 1, wherein the processor is configured to identify the text values to replace in the selected predefined template via execution of an encoder-decoder network on one or more words included in the natural language input.

7. The computing system of claim 1, wherein a value for N is set in advance prior to executing the first neural network on the natural language input.

8. The computing system of claim 1, wherein an output of the first neural network is input to the second neural network and the second neural network is executed in sequence with the first neural network.

9. A method comprising:
storing an initial set of predefined structured query language (SQL) templates, each unique SQL template of the initial set being paired with unique natural language text values corresponding to each respective SQL template;
executing a first neural network on a natural language input, the executing of the first neural network includes reducing the initial set of predefined templates down to a smaller-sized set of N of the predefined templates based on the natural language input, where N is greater in size than one and less in size than a size of the initial set;
executing a second neural network, different than the first neural network, on the smaller-sized set of N predefined templates, the executing of the second neural network includes selecting one predefined template from the smaller-sized set of N predefined templates that most closely matches the natural language input and the natural language text values included in the smaller-sized set of N predefined templates, the natural language input being previously unseen by the first and second neural networks and different than the unique natural language text values corresponding to the selected predefined template from the smaller-sized set of N predefined templates;
generating a SQL command statement corresponding to the natural language input based on replacing one or more text values of the selected predefined template with content from the natural language input; and
generating a response to the natural language input by executing a query against a database, the query being based on the generated SQL command statement.

10. The method of claim 9, wherein the executing the first and second neural networks is based on the set of natural language input texts paired with the set of predefined templates.

11. The method of claim 9, wherein the adding comprises identifying a table from the database that corresponds to the natural language input and adding an identifier of the table into an empty slot of the selected predefined template.

12. The method of claim 11, wherein the adding further comprises identifying a row in the table of the database that corresponds to the natural language input and adding an identifier of the row into an empty slot of the selected predefined template.

13. The method of claim 9, wherein the first neural network comprises a different function for converting predefined template content into vector format than the second neural network.

14. The method of claim 9, wherein the adding comprises identifying the text values to replace in the selected predefined template via execution of an encoder-decoder network on one or more words included in the natural language input.

15. The method of claim 9, wherein a value for N is set in advance prior to executing the first neural network on the natural language input.

16. The method of claim 9, wherein an output of the first neural network is input to the second neural network and the second neural network is executed in sequence with the first neural network.

17. A non-transitory computer-readable medium comprising instructions which when executed by a processor cause a computer to perform a method comprising:
storing an initial set of predefined structured query language (SQL) templates, each unique SQL template of the initial set being paired with unique natural language text values corresponding to each respective SQL template;
executing a first neural network on a natural language input, the executing of the first neural network includes reducing the initial set of predefined templates down to a smaller-sized set of N of the predefined templates based on the natural language input, where N is greater in size than one and less in size than a size of the initial set;
executing a second neural network, different than the first neural network, on the smaller-sized set of N predefined templates, the executing of the second neural network includes selecting one predefined template from the smaller-sized set of N predefined templates that most closely matches the natural language input and the natural language text values included in the smaller-sized set of N predefined templates, the natural language input being previously unseen by the first and second neural networks and different than the unique natural language text values corresponding to the selected predefined template from the smaller-sized set of N predefined templates;
generating a SQL command statement corresponding to the natural language input based on replacing one or more text values of the selected predefined template with content from the natural language input; and
generating a response to the natural language input by executing a query against a database, the query being based on the generated SQL command statement.

18. The non-transitory computer-readable medium of claim 17, wherein the executing the first and second neural networks is based on the set of natural language input texts paired with the set of predefined templates.

19. The non-transitory computer-readable medium of claim 17, wherein the first neural network comprises a different function for converting predefined template content into vector format than the second neural network.

20. The non-transitory computer-readable medium of claim 17, wherein the adding comprises identifying the text values to replace in the selected predefined template via execution of an encoder-decoder network on one or more words included in the natural language input.

* * * * *